US010739763B2

(12) United States Patent
Mourzine et al.

(10) Patent No.: US 10,739,763 B2
(45) Date of Patent: Aug. 11, 2020

(54) INDUSTRIAL CONTROL SYSTEM WITH PREDICTIVE MACHINE LEARNING MODULE

(71) Applicant: Rockwell Automation Technologies, Inc., Mayfield Heights, OH (US)

(72) Inventors: Eugene Mourzine, Twinsburg, OH (US); Alexander B. Smith, Austin, TX (US); Jonathan M. Wise, Chardon, OH (US); Olivia M. Leslie, Cleveland Heights, OH (US); Samuel L. Massari, Cleveland, OH (US); Jonathan D. Walter, Cleveland, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 85 days.

(21) Appl. No.: 16/189,326

(22) Filed: Nov. 13, 2018

(65) Prior Publication Data

US 2020/0150638 A1 May 14, 2020

(51) Int. Cl.
*G05B 19/00* (2006.01)
*G05B 19/418* (2006.01)
*G06N 5/04* (2006.01)
*G05B 19/042* (2006.01)

(52) U.S. Cl.
CPC ... *G05B 19/41885* (2013.01); *G05B 19/0428* (2013.01); *G05B 19/41875* (2013.01); *G06N 5/046* (2013.01)

(58) Field of Classification Search
None
See application file for complete search history.

(56) References Cited

U.S. PATENT DOCUMENTS

| 2009/0089227 | A1* | 4/2009 | Sturrock | G06N 20/00 706/12 |
| 2014/0309756 | A1* | 10/2014 | Trygstad | G05B 13/04 700/31 |
| 2017/0075320 | A1* | 3/2017 | Day | H04J 3/0658 |

* cited by examiner

Primary Examiner — Paul B Yanchus, III

(57) ABSTRACT

An industrial controller within an industrial automation environment is provided. The industrial controller includes a programming logic controller, configured to control an industrial device, and a predictive module, coupled with the programming logic controller. The predictive module is configured to receive configuration data from the programming logic controller, create a user-defined controller tag, and transfer the user-defined controller tag to the programming logic controller. The predictive module is also configured to receive operational data from the programming logic controller, and calculate operation monitoring data and value estimation data based on the operational data. The predictive module is further configured to write the operation monitoring data and value estimation data to the user-defined controller tag.

20 Claims, 10 Drawing Sheets

— 400

| Mixer_01_Model | 410 | |
|---|---|---|
| ▷ Mixer_01_Model.Command | 412 | 0 |
| ▷ Mixer_01_Model.CommandCode | 414 | 0 |
| ▷ Mixer_01_Model.Calculate | 416 | 0 |
| ▷ Mixer_01_Model.SmartTrain | 418 | 0 |
| ▷ Mixer_01_Model.Train | 420 | 0 |
| ▷ Mixer_01_Model.ForceTraining | 422 | 0 |
| ▷ Mixer_01_Model.Reset | 424 | 0 |
| ▷ Mixer_01_Model.FaultCode | 426 | 0 |
| ▲ Mixer_01_Model.Calculations | 428 | |
| ▷ Mixer_01_Model.Calculations.Success | 430 | 0 |
| Mixer_01_Model.Calculations.ActualValue | 432 | 0.0 |
| Mixer_01_Model.Calculations.PredictedValue | 434 | 0.0 |
| Mixer_01_Model.Calculations.RelativeError | 436 | 0.0 |
| ▷ Mixer_01_Model.Calculations.AnomalyDetected | 438 | 0 |
| ▲ Mixer_01_Model.Training | 440 | |
| Mixer_01_Model.Training.AbsoluteError | 442 | 0.0 |
| Mixer_01_Model.Training.RelativeError | 444 | 0.0 |
| Mixer_01_Model.Training.Confidence | 446 | 0.0 |

- Set to 1 to execute analyzer's operational command (restart, etc.). Will auto set to 0 when processing is complete.
- Code of an operational command to be executed
- Set to 1 to calculate once. Will auto set to 0 when complete
- Set to 1 to start SmartTrain. Will set to 0 when complete
- Set to 1 to Train once. Will auto set to 0 when complete
- Set to 1 to change training strategy. Will auto set to 0
- Set to 1 to restart training. Will auto set to 0 when complete
- Fault code from analyzer if anything went wrong

- Calculation status, 0=failure, 1=success
- Actual value of the output variable
- Predicted value, calculated by analyzer
- Calculated between the Actual and Predicted values
- Set to 1 if Relative Error is above defined threshold

- Calculated by analyzer, based on all prior training data samples
- Confidence in the predictive model, calculated by analyzer, based on all prior training data samples

FIGURE 5

INDUSTRIAL CONTROL SYSTEM WITH PREDICTIVE MACHINE LEARNING MODULE

TECHNICAL BACKGROUND

Creating diagnostic analytics solutions in industrial operations has long required expert data scientists with a deep understanding of the specific application to be analyzed. Depending on the complexity of the system, those experts then require weeks, months, or even years to understand and model the system.

As industrial customers undergo digital transformation using production data to help improve business outcomes, they can't afford to wait on expert-driven analytics. Even if there were enough industrial data scientists available, many companies lack the time or funds to employ them.

OVERVIEW

In an embodiment, an industrial controller within an industrial automation environment is provided. The industrial controller includes a programming logic controller, configured to control an industrial device, and a predictive module, coupled with the programming logic controller. The predictive module is configured to receive configuration data from the programming logic controller, create a user-defined controller tag, and transfer the user-defined controller tag to the programming logic controller.

The predictive module is also configured to receive operational data from the programming logic controller, and calculate operation monitoring data and value estimation data based on the operational data. The predictive module is further configured to write the operation monitoring data and value estimation data to the user-defined controller tag.

In another embodiment, a method for operating an industrial controller within an industrial automation environment is provided. The method includes receiving configuration data from a programming logic controller within the industrial controller, creating a user-defined controller tag, and transferring the user-defined controller tag to the programming logic controller.

The method also includes receiving operational data from the programming logic controller, and calculating operation monitoring data and value estimation data based on the operational data. The method further includes writing the operation monitoring data and value estimation data to the user-defined controller tag.

This Overview is provided to introduce a selection of concepts in a simplified form that are further described below in the Technical Disclosure. It should be understood that this Overview is not intended to identify key features or essential features of the claimed subject matter, nor is it intended to be used to limit the scope of the claimed subject matter.

BRIEF DESCRIPTION OF THE DRAWINGS

FIG. 5 illustrates the exemplary User-Defined controller Tag (UDT) from FIG. 4 in further detail.

DETAILED DESCRIPTION

Figure 1:
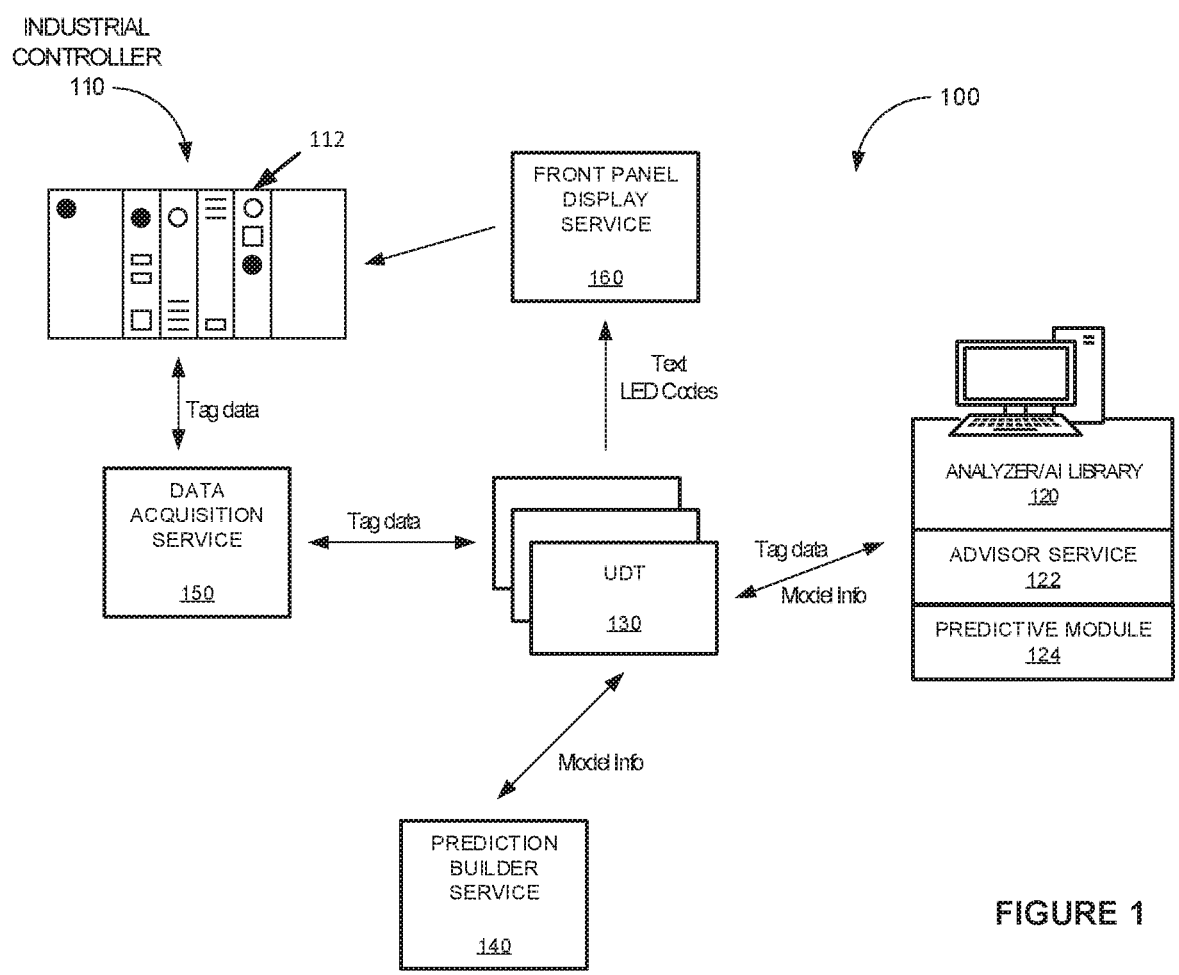
FIG. 1 illustrates an exemplary industrial automation system and its interaction with various software services.

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by claims and their equivalents.

The machine learning control system is an integrated system comprising a Programming Logic Controller (PLC) and a Predictive Module (PM) fitted directly into the controller chassis. The PLC and PM together provide an apparatus and methods that predict anomalous events in an industrial operation predicated on physics-based modeling and data-driven analytics methods. The predictive module is capable of creating models for predicting an output and determining at least one relevant input from a plurality of inputs connected to a selected controller. The data-driven analytics methods are delivered inside a module that fits directly into the controller chassis.

The machine learning control system is capable of providing data analytics capabilities in an environment where data is remaining in the automation layer. This is accomplished by utilizing the controller chassis back plane communication bus and by optimizing data traffic flowing between the PLC and the PM.

An example embodiment of the present invention in part uses a single User-Defined controller Tag (UDT) to configure multiple predictions in a single model; to define prediction inputs, states, and outputs; to communicate operational, training, and calculation commands; and to deliver the results of these operations. This example embodiment also subscribes to controller variables (tags) for all configured predictions without the need of an intermediate data structure.

This minimizes live data communication over the back plane by subscribing only to data from defined controller variables, and by keeping an internal structure of the type of use of each variable for each configured prediction. This example embodiment saves its data model as a controller program instruction tag (UDT), allowing it to communicate directly with the running control program in its native data format, facilitating higher speed predictions than any method running remotely from the PLC.

This example embodiment of a machine learning control system includes the provisioning of two distinct modes of operation—operation monitoring and value estimation.

Operational monitoring is a mode of operation where the system is trained under normal operating conditions until the prediction module reaches a high level of confidence as determined by the machine learning module. Operational anomalies can be found by stopping the training process, continuously calculating predictions on a predefined cadence, and by providing feed back to the controller program by setting an alarm bit if a predicted value differs from an actual value over a predefined threshold.

Value estimation is a mode of operation applicable to environments where an output measurement is either not available at all times, expensive to obtain, or destructive to a physical entity (i.e., a product) being measured in this mode of operation. The training is commenced every time the actual data point is available, and the actual output value is estimated at other calculation times.

Machine learning methods are general purpose (although often fit for different types of data). This makes it difficult for a user (typically a programmer) to know in advance what kind of outcome to expect until that outcome is produced. These two modes of operation (operation monitoring and value estimation) provide user interface guidance to the non-expert user on how to select data and train the machine learning module for a particular outcome.

An example approach in the machine learning control system is to automate the training of models for predicting anomalies in an industrial operation. The smart training mechanism is an automated process of subscribing to data samples on a defined cadence, and running a training algorithm against the data set. If after training for a statistically acceptable number of data samples the model confidence does not reach an acceptable level, the training process is repeated with a different sample rate and with the use of prior data samples to speed up the training. In an example embodiment, the smart training mechanism is triggered automatically by the prediction module detecting the presence of the UDT in the controller program, or manually based on a user configured preference.

In an example embodiment, when the confidence level fails to reach a desired level after a certain time period or number of cycles, there may not be a relationship between the selected inputs and the output. In this case the model must be modified and different inputs must be selected.

This smart training method enables the selection of data from the controller in a self-tuning fashion, adapting to the running control program to automatically determine a sample rate for training. Although this is theoretically possible with remote systems, in practice, this only makes sense to do within the controller.

In an example embodiment, the machine learning control system is configured to automate the data prediction calculations in models for predicting anomalies in an industrial operation. The smart calculation mechanism is an automated process of subscribing to data samples on a defined cadence, and running the calculation algorithm against the data set. In an example embodiment, the smart calculation mechanism is triggered automatically by the prediction module when the trained model reaches an acceptable level of confidence, or manually based on a user configured preference.

This smart calculation method enables the example embodiment to select data from the controller in a self-tuning fashion, adapting to the running control program to automatically determine a sample rate for calculation. Once again, this is theoretically possible with remote systems, but in practice, this is uniquely effective when running against a live control program in-situ.

In an example embodiment, the machine learning control system provides users with a guided prediction configuration, which includes the selection of input variables from the controller set of tags, optional process-specific state variables, the output variable to predict, and for each variable, the upper and lower boundary limits of acceptable values.

These boundary limits differ from standard limits where an alarm is raised when some value goes outside of normal operational bounds. In this example embodiment, the guided prediction mechanism is configured to use these boundary limits to find slow-moving (changing) deviations from normal operation. An AnomalyDetected bit will be set if the predicted output is outside of a percentage (e.g., 10%) of the actual value.

Guided prediction provides a user interface that works with a tag database in the controller to allow the user to select their data set. This can be accomplished external to the controller, but would require the export of the tag database into a remote system. In this example embodiment, the user interface detects the state of integration by reading the control program and adapting the guidance as needed.

In an example embodiment, the machine learning control system also includes ready-to-use templates for common industrial operations. These templates can be modified by the user to reflect specific operational environments. The example embodiment provides users with a subset of input variables that have been selected by the machine learning module as having statistically significant influence on the selected output variable.

Common templates are used to drive the data selection interface for particular operation problems. This is an extensible mechanism that can be used to simplify integration into a variety of industries—condensing the data selection part of a data science project down to a "fill in the blank" exercise, where the available choices come directly from the PLC.

In an example embodiment, users are provided with a set of input variables that have been selected by the machine learning module as having statistically-significant influence on the selected output variable. This feature allows a user to understand what data is correlated with a given prediction.

The use of artificial intelligence (AI) and/or machine learning (ML) helps a human operator model behavior of parts of a manufacturing operation, to predict a metric they can't easily collect, or to detect anomalous behavior in the system before it becomes a maintenance condition. With a simplified user interface and easily understandable operational concepts, both novice and advanced users are able to understand and use the tool.

By embedding statistical data-driven methods for model updating and evaluation the burden on maintaining models is removed for users of the predictive module.

FIG. 1 illustrates an exemplary industrial automation system 100 and its interaction with various software services. This example includes industrial controller 110 and analyzer/artificial intelligence (AI) library 120 for physics-based machine learning which is packaged with advisor service 122 and predictive module (PM) 124. Industrial controller 110 is configured to control one or more industrial machines (not illustrated). In addition to controlling the machines, industrial controller 110 collects a variety of data from the machines such as operating conditions, performance, and the like.

Industrial controller 110 includes Programming Logic Controller (PLC) 112. PLC 112 is configured to exchange tag data with data acquisition service 150, and receive text and LED driver codes from front panel display service 160. Data acquisition service 150 is configured to read tag data from, and send tag data to, UDT 130. UDT 130 is designed to communicate data and models between analyzer 120 and PLC 112. UDT 130 may reside in memory in either analyzer 120 or PLC 112.

UDT 130 is also configured to exchange industrial machine model information with prediction builder service 140, and to send text and LED codes to front panel display service 160.

In this example embodiment, PLC 112 sends configuration data to predictive module 124. When analyzer 120, advisor service 122 and predictive module 124 are physically contained within industrial controller 110, this configuration data is sent over a backplane within industrial controller 110. PM 124 uses this configuration data to automatically create a user interface which allows a user to create UDT 130 based on recommendation from PM 124 and the user's choices.

When UDT 130 is added to a control program within PLC 112, PM 124 interacts with UDT 130 to collect data from the running control program and to perform calculations for operational monitoring and value estimation. PM 124 writes the results of these calculations back into UDT 130. PLC 112 also uses its control program to command PM 124 to execute its functions. (The user may also command PM 124 to execute its functions through a user interface.)

Figure 2:
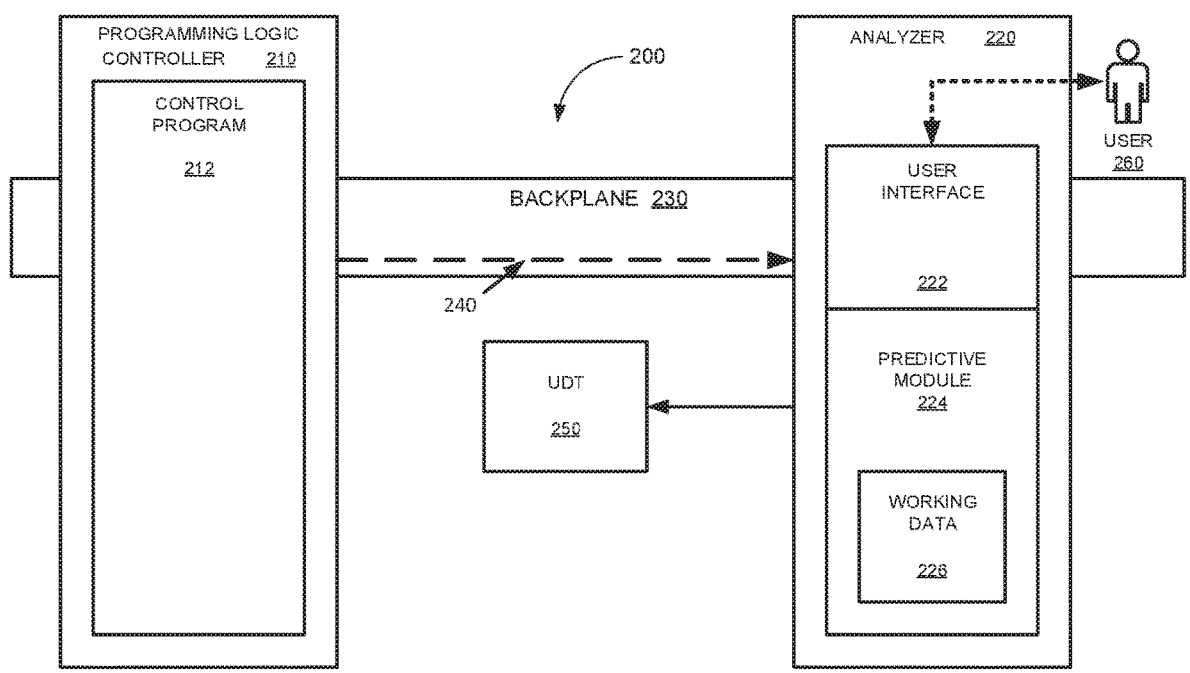
FIG. 2 illustrates an exemplary industrial controller.

FIG. 2 illustrates an exemplary industrial controller 200, such as industrial controller 110 from FIG. 1. In this example embodiment, industrial controller 200 includes programming logic controller (PLC) 210 electrically coupled with analyzer 220 over backplane 230. PLC 210 includes control program 212. Analyzer 220 includes user interface 222 and predictive module (PM) 224. Working data 226 is stored in memory within analyzer 220.

In this example embodiment, data 240 from PLC 210 is sent to predictive module 224 over backplane 230. This data may include configuration information, environment information, and the like for PLC 210 and the equipment it controls.

User 260, through user interface 220 receives suggestions from analyzer 220 for inputs to monitor which are statistically significant in relation to outputs that user 260 wishes to monitor. User 260 makes a selection of input variables from a set of tags available within a tag database for PLC 210, along with an output variable to predict. Optionally, the user may select process-specific state variables related to the process being monitored.

For each variable, upper and lower limits of acceptable values are selected by user 260 with optional recommendations from PM 224. At this point, PM 224 creates User-Defined controller Tag (UDT) 250 within memory in analyzer 220.

Figure 3:
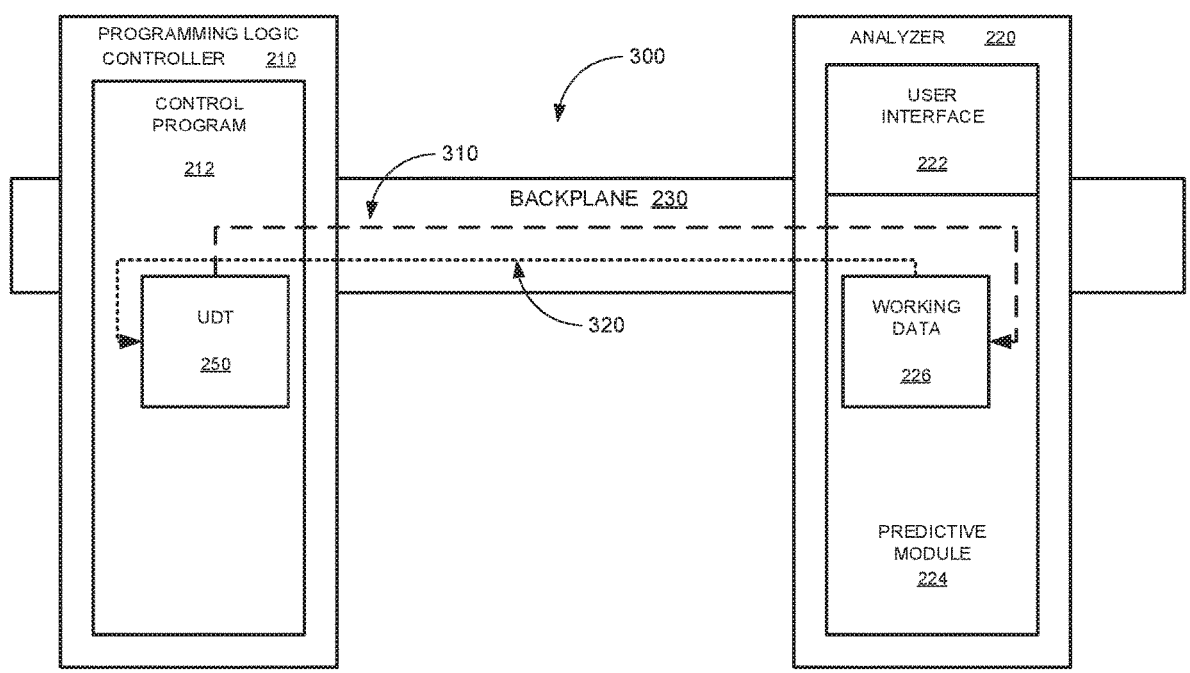
FIG. 3 illustrates an exemplary industrial controller.

FIG. 3 illustrates an exemplary industrial controller 300, such as industrial controller 110 from FIG. 1 in operation. In this example embodiment, PM 224 has transferred UDT 250 to memory within PLC 210 and its control program 212. At this point analyzer 220 interacts with UDT 250 to collect data 310 from the running control program 212 which PM 224 uses to perform its calculations for operational monitoring and value estimation. During calculation, PM 224 stores working data 226 in memory within analyzer 220. When the calculations are complete PM 224 transfers the results 320 back to UDT 250 over backplane 230.

Figure 4:
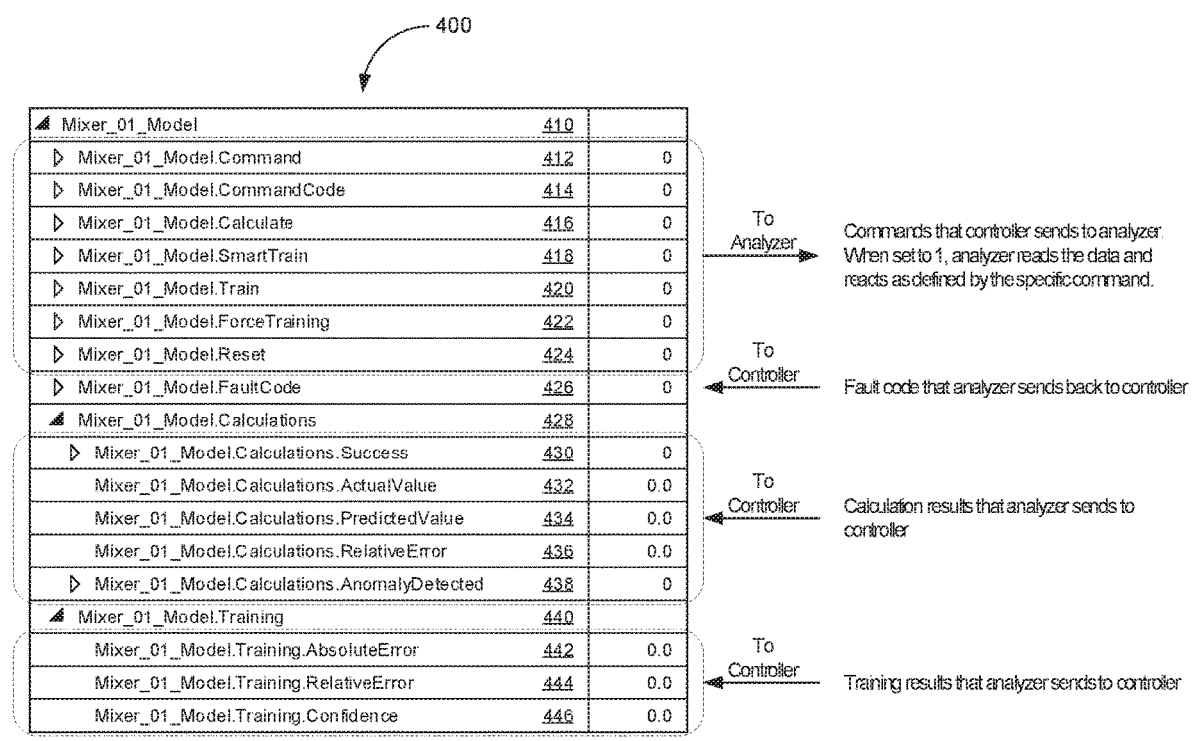
FIG. 4 illustrates an exemplary User-Defined controller Tag (UDT).

FIG. 4 illustrates an exemplary User-Defined controller Tag (UDT) 400, such as UDT 250 from FIG. 2. In this example UDT 400 for a single prediction model, various tags and their associated values are illustrated. In this example embodiment an industrial mixer is modeled, starting with Mixer_01_Model tag 410.

Tags 412-424 and their associated values are commands sent from programming logic controller 210 to analyzer 220 over backplane 230. These commands are described in further detail with respect to FIG. 5. When the value of any of these tags is set to 1, analyzer 220 reads operational data from PLC 210 and reacts as defined by the specific command.

Tag 426, Mixer_01_Model.FaultCode, is a fault code that analyzer 220 sends back to PLC 210. Header tag 428, Mixer_01_Model.Calculations, is a header tag for the various tags configured to store results from calculations performed by analyzer 220. Tags 430-438 are the tags configured to store results from calculations performed by analyzer 220 and sent to PLC 210 over backplane 230.

Header tag 440, Mixer_01_Model.Training, is a header tag for the various tags configured to store status results of training of the model performed by analyzer 220. Tags 442-446 are the tags configured to store status results of training of the model performed by analyzer 220 and sent to PLC 210 over backplane 230.

Note that the tags and values illustrated in FIGS. 4 and 5 are simply examples of one embodiment of a User-Defined controller Tag (UDT). Many other configurations and structures are possible within the scope of the present invention.

FIG. 5 illustrates the exemplary User-Defined controller Tag (UDT) 400 from FIG. 4 in further detail. In this example embodiment, tag 410 is the overall header tag for the model of industrial mixer 01, and is labeled Mixer_01_Model.

Tag 412, Mixer_01_Model.Command, when set to 1 will execute analyzer 220's operational command (such as restart, or the like). This tag auto sets to 0 when the processing is complete. Tag 414, Mixer_01_Model.CommandCode, stores the code of an operational command to be executed by analyzer 220. Tag 416, Mixer_01_Model.Calculate, is set to 1 to calculate the command once. This tag auto sets to 0 when the processing is complete.

Tag 418, Mixer_01_Model.SmartTrain, directs analyzer 220 to start training when set to 1. This tag auto sets to 0 when the processing is complete. Tag 420, Mixer_01_Model.Train, directs analyzer 220 to train once when set to 1. This tag auto sets to 0 when the processing is complete. Tag 422, Mixer_01_Model.ForceTraining, directs analyzer 220 to change training strategy. This tag auto sets to 0 when the processing is complete.

Tag 424, Mixer_01_Model.Reset, directs analyzer 220 to restart training. This tag auto sets to 0 when the processing is complete. Tag 426, Mixer_01_Model.FaultCode, contains a fault code from analyzer 220 if any errors are detected.

Tag 428, Mixer_01_Model.Calculations, is a header tag for the tags containing calculation results from analyzer 220. Tag 430, Mixer_01_Model.Calculations.Success, contains the calculation status from analyzer 220. 0 indicates a failure, and 1 indicates success. Tag 432, Mixer_01_Model.Calculations.ActualValue, contains the actual value result of the calculation from analyzer 220.

Tag 434, Mixer_01_Model.Calculations.PredictedValue, contains the predicted value result of the calculation from analyzer 220. Tag 436, Mixer_01_Model.Calculations.RelativeError, contains the difference between the actual and predicted values calculated by analyzer 220. Tag 438, Mixer_01_Model.Calculations.AnomalyDetected, is set to 1 if the relative error is above a defined threshold.

Tag 440, Mixer_01_Model.Training, is a header tag for the tags containing training results from analyzer 220. Tag 442, Mixer_01_Model.Training.AbsoluteError, is calculated by analyzer 220, based on all prior training data samples. Tag 444, Mixer_01_Model.Training.Relative Error, is calculated by analyzer 220, based on all prior training data samples. Tag 446, Mixer_01_Model.Training.Confidence, contains the confidence in the predictive model, calculated by analyzer 220, based on all prior training data samples.

Note that these tag names, values, and their meanings are simply one example of a User-Defined controller Tag (UDT). Many other configurations are possible, and their contents will be determined by the type of device, inputs, status, outputs, and limits desired to be operationally monitored, and the predictive values desired, all within the scope of the present invention.

Figure 6:
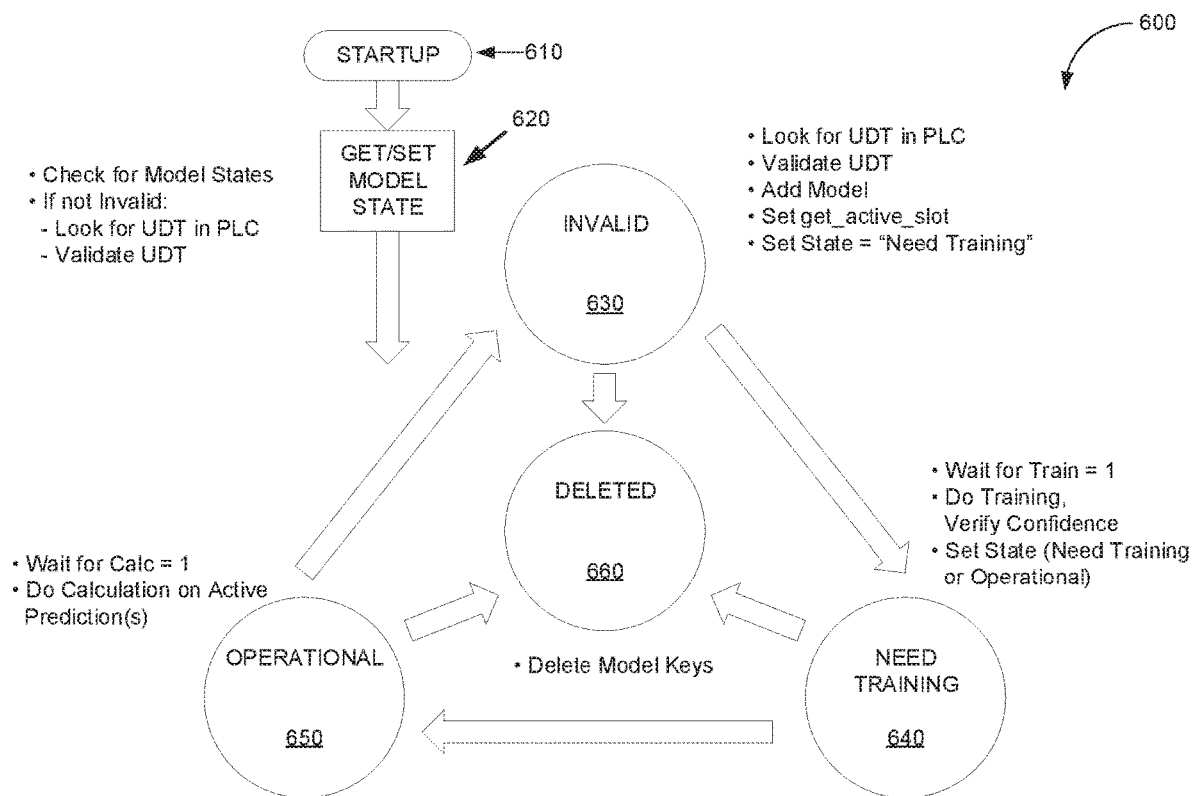
FIG. 6 illustrates a state diagram of an exemplary advisor module within an analyzer in an industrial controller.

FIG. 6 illustrates a state diagram of an exemplary advisor module 600 within an analyzer in an industrial controller, such as analyzer 120 from FIG. 1. In this example state diagram, analyzer 120 upon startup 610 checks for model states 620, and if it finds models that are valid, it looks for a User-Defined controller Tag (UDT) within the control logic within programming logic controller 112. It then validates the UDT to ensure that all elements of the tag are present.

In the Invalid state 630 the advisor module looks for a User-Defined controller Tag (UDT) within the control logic within programming logic controller 112. It then validated the UDT. It adds the model and sets the get active slot tag (described further below) and sets a state to "Need Training" indicating that the model has not been sufficiently trained yet, and transfers control of the advisor module to the Need Training state 640.

In the Need Training state 640, the advisor module trains the model. The smart training mechanism is an automated process of subscribing to data samples on a defined cadence, and running a training algorithm against the data set. If after training for a statistically acceptable number of data samples the model confidence does not reach an acceptable level, the training process is repeated with a modified sample rate and with the use of prior data samples to speed up the training.

In an example embodiment, the smart training mechanism is triggered automatically by the prediction module detecting the presence of the UDT in the controller program, or manually based on a user configured preference. This smart training method enables the selection of data from the controller in a self-tuning fashion, adapting to the running control program to automatically determine a sample rate for training.

Once the training has reached an acceptable level the advisor module transfers control to the Operational state 650, where the predictive module is now ready to perform operational monitoring and value estimation based on operational data received from industrial controller 110.

In the operational state 650, the predictive module may perform calculations and analysis on a pre-determined cadence or may perform the calculations and analysis when a calculate tag is set in the UDT. In Deleted state 660, the model keys are deleted.

Figure 7:
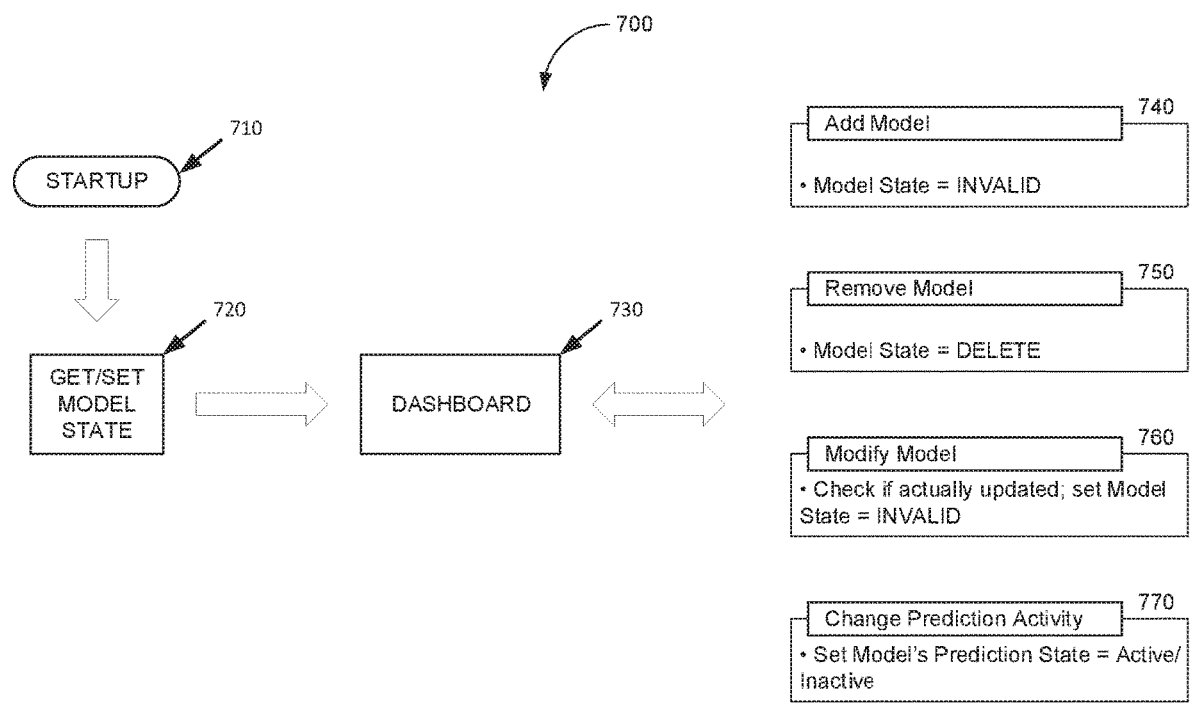
FIG. 7 illustrates a state diagram of an exemplary user interface module within an analyzer in an industrial controller.

FIG. 7 illustrates a state diagram of an exemplary user interface module 700 within an analyzer in an industrial controller, such as analyzer 120 from FIG. 1. In this example embodiment of a user interface controller, upon startup 710 the user interface module gets or sets a model state 720, then proceeds to a Dashboard state 730, where several different operations are performed.

In an Add Model operation 740, a model state is set to "INVALID." In a Remove Model operation 750, the model state is set to "DELETE." In a Modify Model operation 760, the user interface module checks to see if the model is actually updated and sets the model state to "INVALID." In a Change Prediction Activity operation 770, the user interface module sets the model's prediction state to active or inactive.

Figure 8:
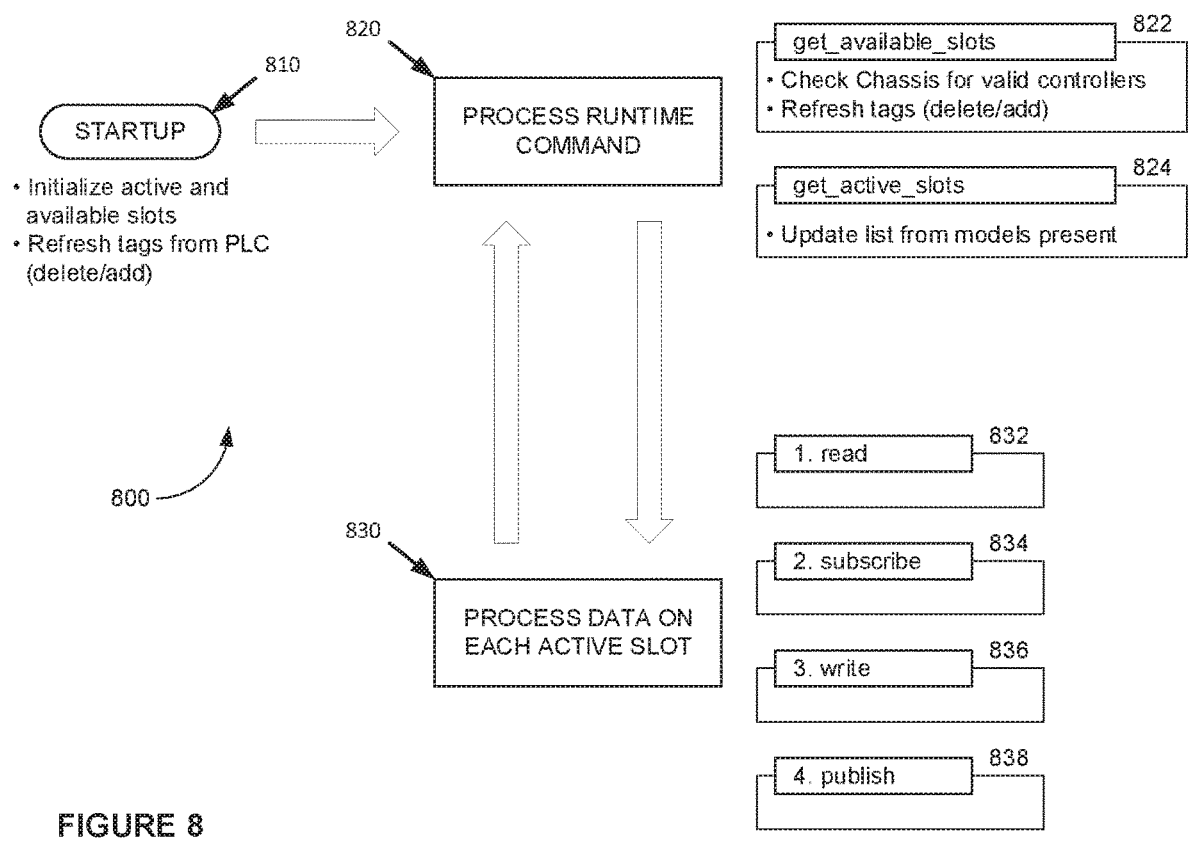
FIG. 8 illustrates a state diagram of an exemplary data analysis module within an analyzer in an industrial controller.

FIG. 8 illustrates a state diagram of an exemplary data analysis module 800 within an analyzer in an industrial controller, such as analyzer 120 from FIG. 1. In this module, analyzer 220 and programming logic controller 210 check industrial controller 110 for active slots and initialize models for the active slots.

Upon startup 810, the data analysis module 800 initializes active and available slots within industrial controller 110, and refreshes tags from the PLC. Data analysis module 800 passes control to process runtime command state 820 where the module may get available slots 822 by checking the chassis for valid (supported) controllers, and refreshes tags related to those slots. The module may get active slots 834 and updates a list with the models that are present.

When control passes to the Process Data on each Active Slot state 830, the module may perform a read operation 832, a subscribe operation 834, a write operation 839, or a publish operation 838.

Figure 9:
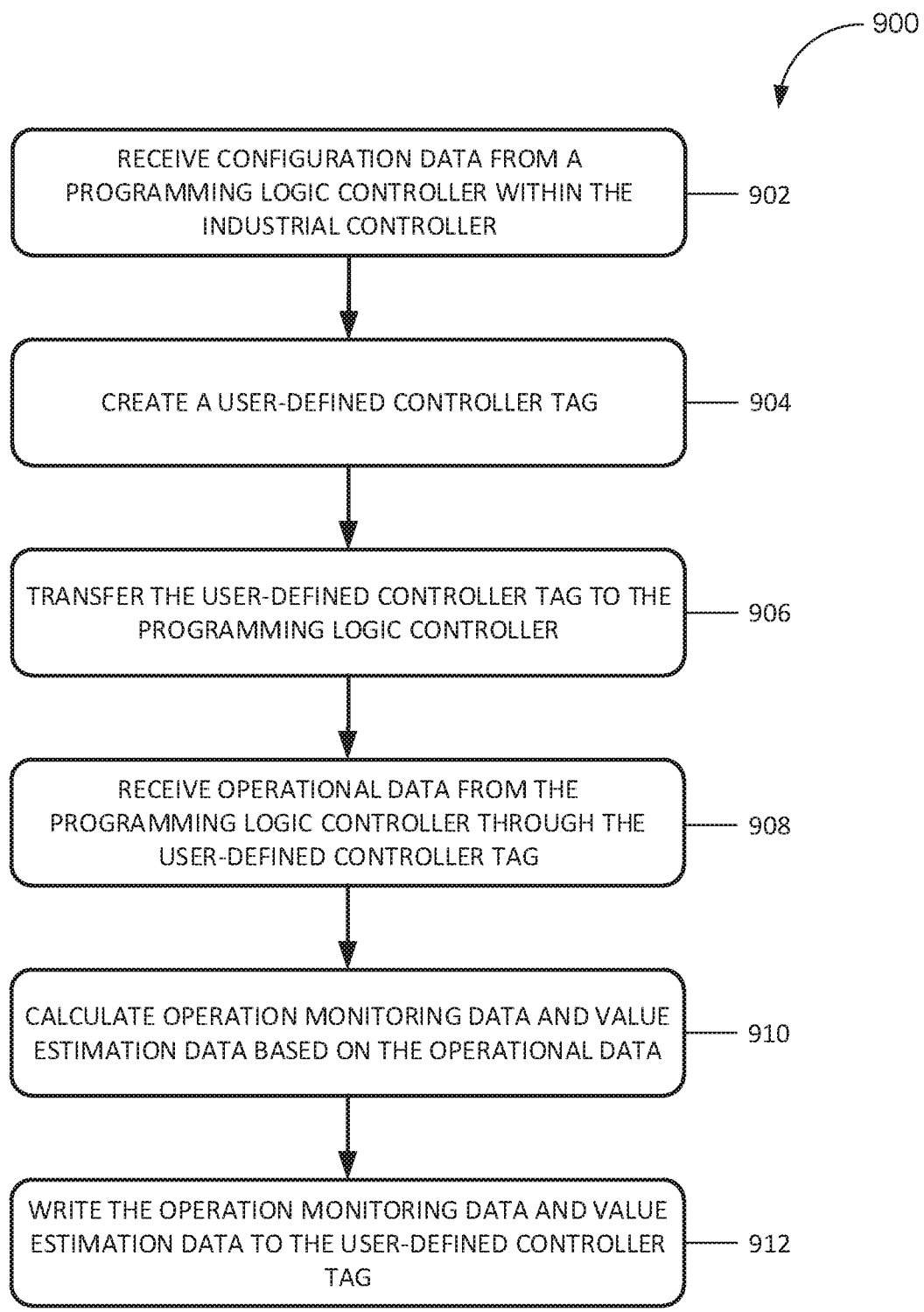
FIG. 9 illustrates a flow chart of an exemplary method for operating an industrial controller within an industrial automation environment.

FIG. 9 illustrates a flow chart 900 of an exemplary method for operating an industrial controller 110 within an industrial automation environment 100. In this example embodiment, predictive module 224 receives configuration data from Programming Logic Controller (PLC) 210 within industrial controller 110, (operation 902).

Predictive module 224 creates a User-Defined controller Tag (UDT) 250, (operation 904). Predictive module 224 transfers UDT 250 to PLC 210 over backplane 230, (operation 906). Predictive module 224 receives operational data from PLC 210, (operation 908).

Predictive module 224 calculates operation monitoring data and value estimation data based on the operational data, (operation 910). Predictive module 224 then writes the operation monitoring data and value estimation data to UDT 250, (operation 912).

Figure 10:
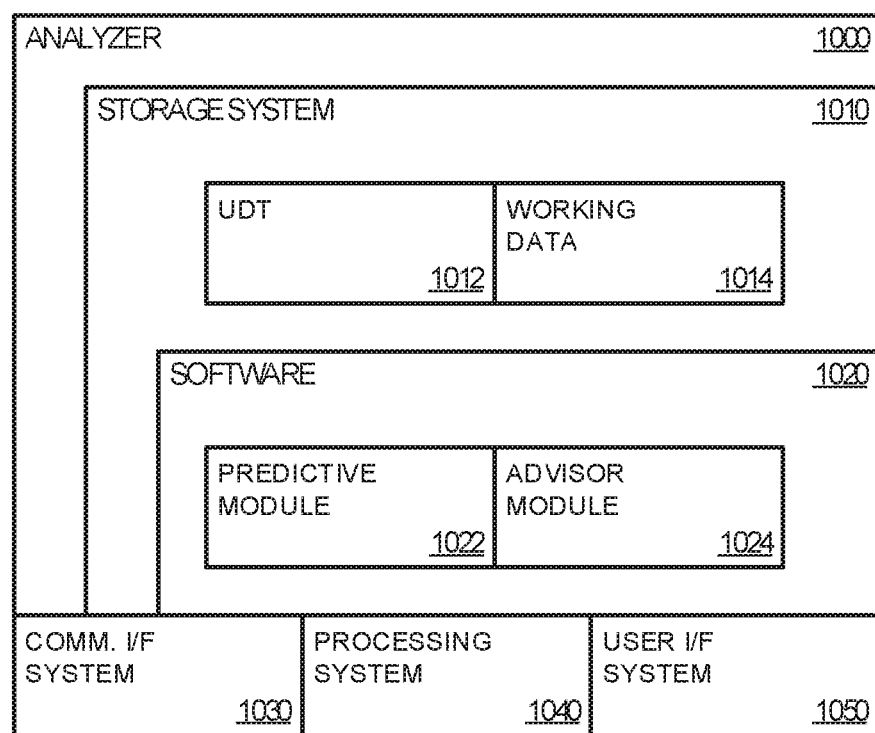
FIG. 10 illustrates an exemplary analyzer within an industrial automation system.

FIG. 10 illustrates an exemplary analyzer 1000, such as analyzer 120 from FIG. 1, within an industrial automation system, such as industrial automation system 100 from FIG. 1.

Analyzer 1000 includes user interface system 1050, communication interface system 1030, processing system 1040, and storage system 1010. Storage system 1010 in the example shown includes software 1020. In some examples, software 1020 comprises predictive module 1022 and advisor module 1024, that configures the analyzer 1000, when executed by the analyzer 1000 in general or processing system 1040 in particular, to direct analyzer 1000 to perform industrial automation operations, such as operating an industrial controller as illustrated in FIG. 9. Other data, such as a user-defined controller tag 1012 and working data 1014, is also stored in storage system 1010. In an example embodiment user-defined controller tag 1012 includes a model of the industrial device including multiple variables, definitions of inputs, states, and outputs, commands, and results, or the like, as described herein.

Processing system 1040 may comprise a microprocessor and other circuitry that retrieves and executes software 1020 from storage system 1010. Processing system 1040 may be implemented within a single processing device, but may also be distributed across multiple processing devices or sub-systems that cooperate in executing program instructions. Examples of processing system 1040 include general purpose central processing units, application specific processors, and logic devices, as well as any other type of processing device, combinations, or variations.

Storage system 1010 may comprise any computer readable storage media readable by processing system 1040 and capable of storing software 1020. Storage system 1010 may include volatile and nonvolatile, removable and non-removable media implemented in any method or technology for storage of information, such as computer readable instructions, data structures, program modules, or other data. Storage system 1010 may be independent from or integrated into processing system 1040. Storage system 1010 can comprise additional elements, such as a memory controller, capable of communicating with processing system 1040. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the storage media a propagated signal.

In addition to storage media, in some implementations storage system 1010 may also include communication media over which software 1020 may be communicated internally or externally. Storage system 1010 may be implemented as a single storage device but may also be implemented across multiple storage devices or sub-systems co-located or distributed relative to each other. Storage system 1010 may comprise additional elements capable of communicating with processing system 1040 or possibly other systems.

Software 1020 may be implemented in program instructions and among other functions and may, when executed by processing system 1040, direct processing system 1040 to operate as described herein. In particular, the program instructions may include various components or modules that cooperate or otherwise interact to implement at least a portion of server or customer environment 1000. The various components or modules may be embodied in compiled or interpreted instructions or in some other variation or combination of instructions. The various components or modules may be executed in a synchronous or asynchronous manner, in a serial or in parallel, in a single threaded environment or multi-threaded, or in accordance with any other suitable execution paradigm, variation, or combination thereof. Software 1020 in the examples comprises computer programs, firmware, or some other form of machine-readable processing instructions. Software 1020 may include an operating system, utilities, drivers, network interfaces, applications, virtual machines, or some other type of software. Software 1020 may include additional processes, programs, or components, such as operating system software or other application software. Software 1020 may also comprise firmware or some other form of machine-readable processing instructions executable by processing system 1040.

In general, software 1020, when loaded into processing system 1040 and executed, may transform a suitable apparatus, system, or device from a general-purpose computing system into a special-purpose computing system customized to assist in updating industrial automation controller firmware, among other operations. Indeed, encoding software 1020 on storage system 1010 may transform the physical structure of storage system 1010. The specific transformation of the physical structure may depend on various factors in different implementations of this description. Examples of such factors may include, but are not limited to the technology used to implement the storage media of storage system 1010 and whether the computer-storage media are characterized as primary or secondary storage, as well as other factors.

User interface system 1050 may include communication connections and devices that allow for communication with users over a communication network or collection of networks. User interface system 1050 may include user input and output devices for being controlled by a user, or these devices may be external to server or customer environment 400.

User interface system 1050 may comprise a network card, network interface, port, or interface circuitry that allows analyzer 1000 to communicate over a network or networks. User interface system 1050 may also include a memory device, software, processing circuitry, or some other device. User interface system 1050 can use any suitable communication protocol to exchange communications with a user.

User interface system 1050 may include components that communicate over communication links, such as network cards, ports, RF transceivers, processing circuitry and software, or other communication components. User interface system 1050 may be configured to communicate over electrically conductive, wireless, optical, or other links.

User interface system 1050 can further include components that interact with a user to receive user inputs and user communications and to present media and/or information. These components typically include a keyboard, display, indicator lights, speakers, touch pads, microphone, buttons, mouse, or other user input/output apparatus, including combinations thereof.

Communication interface system 1030 may include communication connections and devices that allow for communication with computers, such as industrial controller 110, over a backplane, a communication network, or a collection of networks.

Communication interface system 1030 may comprise a network card, network interface, port, or interface circuitry that allows analyzer 1000 to communicate over a network or networks. Communication interface system 1030 may also include a memory device, software, processing circuitry, or some other device. Communication interface system 1030 can use any suitable communication protocol to exchange communications with another computer.

Communication interface system 1030 may include components that communicate over communication links, such as network cards, ports, RF transceivers, processing circuitry and software, or other communication components. Communication interface system 1030 may be configured to communicate over electrically conductive, wireless, optical, or other links.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. An industrial controller within an industrial automation environment, the industrial controller comprising:
   a programming logic controller, configured to control an industrial device; and a predictive module, coupled with the programming logic controller configured to:
  receive configuration data from the programming logic controller;
  create a user-defined controller tag;
  transfer the user-defined controller tag to the programming logic controller;
  receive operational data from the programming logic controller;
  calculate operation monitoring data and value estimation data based on the operational data; and
  write the operation monitoring data and value estimation data to the user-defined controller tag.

2. The industrial controller of claim 1, wherein:
  the programming logic controller is coupled with the predictive module by a backplane; and
  the user-defined controller tag comprises:
    a model of the industrial device including multiple variables;
    definitions of inputs, states, and outputs;
    commands; and
    results.

3. The industrial controller of claim 1, wherein the predictive module is further configured to:
  subscribe to operational data samples on a defined cadence;
  create a model of the industrial device including multiple variables; and
  train the model of the industrial device with the operational data samples to a model confidence level.

4. The industrial controller of claim 3, wherein the predictive module is further configured to begin training the model of the industrial device when the user-defined controller tag is detected within the programming logic controller.

5. The industrial controller of claim 3, wherein the predictive module is further configured to:
  compare the model confidence level to a desired model confidence level; and
  if the model confidence level is less than the desired model confidence level, train the model of the industrial device at a modified data sample rate.

6. The industrial controller of claim 3, wherein the predictive module is further configured to:
  subscribe to operational data on a defined calculation cadence;
  calculate operation monitoring data and value estimation data based on the operational data on the defined calculation cadence; and
  transfer the operation monitoring data and value estimation data to the user-defined controller tag over the backplane.

7. The industrial controller of claim 6, wherein the predictive module is further configured to:
  compare the operation monitoring data and value estimation data to one or more boundary limits; and
  trigger an alarm within the programming logic controller when the operation monitoring data or value estimation data exceed any of the one or more boundary limits.

8. The industrial controller of claim 3, wherein the predictive module is configured to:
  compare the model confidence level to a desired model confidence level; and
  if the model confidence level meets or exceeds the desired model confidence level:
    subscribe to operational data on a defined calculation cadence;
    calculate operation monitoring data and value estimation data based on the operational data on the defined calculation cadence; and
    transfer the operation monitoring data and value estimation data to the user-defined controller tag.

9. The industrial controller of claim 1, wherein the predictive module is further configured to:
  receive a selection of an output variable to predict through a user interface;
  display one or more input variables having a statistically significant effect on the output variable on the user interface;
  receive a selection from the one or more input variables through the user interface;
  display suggested limits for at least one of the selected output variable and the selected input variables on the user interface;
  receive limits for at least one of the selected output variable and the selected input variables through the user interface; and
  store the selected output variable, the selected input variables, and the limits within the user-defined controller tag.

10. The industrial controller of claim 1, wherein the predictive module is further configured to:
  determine recommended input variables and output variables based the configuration data; and
  display the recommended input variables and output variables on a user interface.

11. A method for operating an industrial controller within an industrial automation environment, the method comprising:
  receiving configuration data from a programming logic controller within the industrial controller;
  creating a user-defined controller tag;
  transferring the user-defined controller tag to the programming logic controller;
  receiving operational data from the programming logic controller;
  calculating operation monitoring data and value estimation data based on the operational data; and
  writing the operation monitoring data and value estimation data to the user-defined controller tag.

12. The method of claim 11, wherein the user-defined controller tag comprises:
  a model of the industrial device including multiple variables;
  definitions of inputs, states, and outputs;
  commands; and
  results.

13. The method of claim 1, further comprising:
  subscribing to operational data samples on a defined cadence;
  creating a model of the industrial device including multiple variables; and
  training the model of the industrial device with the operational data samples to a model confidence level.

14. The method of claim 13, further comprising:
  beginning training the model of the industrial device when the user-defined controller tag is detected within the programming logic controller.

15. The method of claim 13, further comprising:
  comparing the model confidence level to a desired model confidence level; and
  if the model confidence level is less than the desired model confidence level, training the model of the industrial device at a modified data sample rate.

16. The method of claim 13, further comprising:
subscribing to operational data on a defined calculation cadence;
calculating operation monitoring data and value estimation data based on the operational data on the defined calculation cadence; and
transferring the operation monitoring data and value estimation data to the user-defined controller tag over a backplane.

17. The method of claim 16, further comprising:
comparing the operation monitoring data and value estimation data to one or more boundary limits; and
triggering an alarm within the programming logic controller when the operation monitoring data or value estimation data exceed any of the one or more boundary limits.

18. The method of claim 13, further comprising:
comparing the model confidence level to a desired model confidence level; and
if the model confidence level meets or exceeds the desired model confidence level:
    subscribing to operational data on a defined calculation cadence;
    calculating operation monitoring data and value estimation data based on the operational data on the defined calculation cadence; and
    transferring the operation monitoring data and value estimation data to the user-defined controller tag.

19. The method of claim 11, further comprising:
receiving a selection of an output variable to predict through a user interface;
displaying one or more input variables having a statistically significant effect on the output variable on the user interface;
receiving a selection from the one or more input variables through the user interface;
displaying suggested limits for at least one of the selected output variable and the selected input variables on the user interface;
receiving limits for at least one of the selected output variable and the selected input variables through the user interface; and
storing the selected output variable, the selected input variables, and the limits within the user-defined controller tag.

20. The method of claim 11, further comprising:
determining recommended input variables and output variables based the configuration data; and
displaying the recommended input variables and output variables on a user interface.

* * * * *